United States Patent
Koppich et al.

(10) Patent No.: US 8,127,217 B2
(45) Date of Patent: *Feb. 28, 2012

(54) DOCUMENT MANAGEMENT SYSTEM FOR TRANSFERRING A PLURALITY OF DOCUMENTS

(75) Inventors: George Koppich, Palos Verdes Estates, CA (US); Lenin Babu, Lake Forest, CA (US); Carl Byington, Blue Jay, CA (US)

(73) Assignees: Kabushiki Kaisha Toshiba, Tokyo (JP); Toshiba Tec Kabushiki Kaisha, Tokyo (JP)

( * ) Notice: Subject to any disclaimer, the term of this patent is extended or adjusted under 35 U.S.C. 154(b) by 457 days.

This patent is subject to a terminal disclaimer.

(21) Appl. No.: 12/351,305

(22) Filed: Jan. 9, 2009
(Under 37 CFR 1.47)

(65) Prior Publication Data
US 2010/0088581 A1    Apr. 8, 2010

Related U.S. Application Data

(63) Continuation-in-part of application No. 10/269,572, filed on Oct. 10, 2002, now Pat. No. 7,478,316, and a continuation-in-part of application No. 11/064,478, filed on Feb. 23, 2005, each which is a continuation-in-part of application No. 10/125,856, filed on Apr. 19, 2002, now Pat. No. 7,532,340.

(51) Int. Cl.
*G06N 3/00* (2006.01)
(52) U.S. Cl. .......... 715/200; 715/201; 703/175
(58) Field of Classification Search .......... 715/200, 715/202, 203, 204, 201; 713/175
See application file for complete search history.

(56) References Cited

U.S. PATENT DOCUMENTS 5,291,405 A    3/1994  Kohari
(Continued)

FOREIGN PATENT DOCUMENTS

EP    0 442 054    8/1991
(Continued)

OTHER PUBLICATIONS

Convergence and Hybrid Information Technology, 2008, International Conference, "Design of Security Mechanism for Electronic Document Repository System", by SangYeob Na et al., pp. 708-715.*

(Continued)

*Primary Examiner* — Stephen Hong
*Assistant Examiner* — Mario M Velez-Lopez
(74) *Attorney, Agent, or Firm* — SoCal IP Law Group LLP; Steven C. Sereboff; Jonathan Pearce

(57) ABSTRACT

The subject application is directed to managing electronic documents in associated data storage areas. User identification is received and indicia of data storage areas is displayed. Storage selection is received from the user to store incoming electronic documents. A storage area is then designated in accordance with the received selection and identification data. A shadow data storage area associated with the designated area is created and an access code associated with the designated area is determined. An input of incoming document systems is associated with the shadow area based upon the selection data. Documents are received, in their native formats, from the systems into the shadow storage area. The access code is then associated with each incoming document in the shadow data storage area. A log of history for each document is generated. The documents and logs are routed into the designated area from the shadow area.

14 Claims, 6 Drawing Sheets

U.S. PATENT DOCUMENTS

| | | | |
|---|---|---|---|
| 5,371,888 A | 12/1994 | Lehnertz et al. | |
| 5,423,034 A | 6/1995 | Cohen-Levy et al. | |
| 5,442,732 A | 8/1995 | Matysek et al. | |
| 5,666,490 A | 9/1997 | Gillings et al. | |
| 5,748,738 A * | 5/1998 | Bisbee et al. | 713/176 |
| 5,784,610 A | 7/1998 | Copeland et al. | |
| 5,802,253 A | 9/1998 | Gross et al. | |
| 5,850,526 A | 12/1998 | Chou | |
| 5,862,321 A | 1/1999 | Lamming et al. | |
| 5,892,909 A | 4/1999 | Grasso et al. | |
| 5,897,650 A | 4/1999 | Nakajima et al. | |
| 5,923,845 A | 7/1999 | Kamiya et al. | |
| 5,924,090 A | 7/1999 | Krellenstein | |
| 5,948,058 A | 9/1999 | Kudoh et al. | |
| 5,987,506 A | 11/1999 | Carter et al. | |
| 6,009,442 A | 12/1999 | Chen et al. | |
| 6,081,810 A | 6/2000 | Rosenzweig et al. | |
| 6,088,696 A | 7/2000 | Moon et al. | |
| 6,092,090 A * | 7/2000 | Payne et al. | 715/234 |
| 6,105,042 A | 8/2000 | Aganovic et al. | |
| 6,108,100 A | 8/2000 | McVey et al. | |
| 6,119,137 A | 9/2000 | Smith et al. | |
| 6,199,073 B1 | 3/2001 | Peairs et al. | |
| 6,212,512 B1 | 4/2001 | Barney et al. | |
| 6,216,122 B1 | 4/2001 | Elson | |
| 6,230,156 B1 | 5/2001 | Hussey | |
| 6,236,767 B1 | 5/2001 | Altman | |
| 6,237,096 B1 * | 5/2001 | Bisbee et al. | 713/178 |
| 6,253,217 B1 * | 6/2001 | Dourish et al. | 715/229 |
| 6,266,683 B1 | 7/2001 | Yehuda et al. | |
| 6,289,460 B1 | 9/2001 | Hajmiragha | |
| 6,308,179 B1 | 10/2001 | Petersen et al. | |
| 6,324,551 B1 * | 11/2001 | Lamping et al. | 715/229 |
| 6,370,538 B1 * | 4/2002 | Lamping et al. | 1/1 |
| 6,446,072 B1 | 9/2002 | Schulze et al. | |
| 6,473,794 B1 | 10/2002 | Guheen et al. | |
| 6,562,076 B2 | 5/2003 | Edwards et al. | |
| 6,725,228 B1 | 4/2004 | Clark et al. | |
| 6,778,972 B2 | 8/2004 | Leonardos | |
| 6,868,451 B1 | 3/2005 | Peacock | |
| 6,897,971 B1 | 5/2005 | Marshall et al. | |
| 6,898,636 B1 * | 5/2005 | Adams et al. | 709/229 |
| 7,043,482 B1 | 5/2006 | Vinsonneau | |
| 7,191,195 B2 * | 3/2007 | Koyama et al. | 1/1 |
| 7,478,316 B2 * | 1/2009 | Koppich et al. | 715/200 |
| 2001/0014908 A1 | 8/2001 | Lo et al. | |
| 2001/0034845 A1 * | 10/2001 | Brunt et al. | 713/201 |
| 2001/0056463 A1 | 12/2001 | Grady et al. | |
| 2002/0042815 A1 * | 4/2002 | Salzfass et al. | 709/206 |
| 2002/0065848 A1 | 5/2002 | Walker et al. | |
| 2003/0167191 A1 | 9/2003 | Slabonik et al. | |
| 2006/0227378 A1 * | 10/2006 | Mihira | 358/1.16 |
| 2007/0016800 A1 * | 1/2007 | Spottswood et al. | 713/193 |
| 2007/0033200 A1 | 2/2007 | Gillespie | |
| 2007/0055882 A1 * | 3/2007 | Gaucas et al. | 713/175 |
| 2008/0178297 A1 * | 7/2008 | Ikeda et al. | 726/28 |
| 2008/0217403 A1 * | 9/2008 | Ormond | 235/385 |

FOREIGN PATENT DOCUMENTS

| | | |
|---|---|---|
| EP | 1 087 306 | 3/2001 |
| WO | WO 02/25927 | 6/2002 |

OTHER PUBLICATIONS

International Search Report related to PCT/US03/12372 dated Jul. 21, 2003.

Groupwise 5.5 Software Manual.

Supplemental European Search Report, European Application No. 03 72 6392, Feb. 2, 2006.

Teege 6: "Feature Combination: Position Paper About Composability Issues in Object-Orientation," Jul. 9, 1996.

USPTO, Introduction to the Automated Patent System using WEST, 1999, pp. 1-67.

Mauriello, Ermelindo, "TCFS: Transparent Cryptographic File System," Aug. 1, 1997, <http:www.linuxjournal.com/article/2174>, pp. 1-7.

* cited by examiner

DOCUMENT MANAGEMENT SYSTEM FOR TRANSFERRING A PLURALITY OF DOCUMENTS

CROSS-REFERENCE TO RELATED APPLICATIONS

This Application is a continuation-in-part of U.S. patent application Ser. No. 10/269,572 entitled "Document Management System for Transferring a Plurality of Documents" filed Oct. 10, 2002, now U.S. Pat. No. 7,478,316 and a continuation-in-part of U.S. patent application Ser. No. 11/064,478 entitled "Document Management System for Automating Operations Performed on Documents in Data Storage Areas" filed Feb. 23, 2005, both of which are continuation-in-part of U.S. patent application Ser. No. 10/125,856 entitled "Document Management System Rule-Based Automation" filed Apr. 19, 2002, now U.S. Pat. No. 7,532,340.

BACKGROUND OF THE INVENTION

The subject application is directed generally to document management systems. The application is particularly applicable to a document management system to automate transferring a plurality of documents or related data.

Enterprises around the world are recognizing that information is the currency of their business. As such, there is tremendous value in ensuring that all corporate information, whether in structured or unstructured formats is captured, managed, and put to work in a meaningful and efficient way. Document management and content management solutions help organizations maximize the use of their unstructured data, which in turn helps maximize the use of their corporate knowledge. Unstructured data is information stored in text files, emails, documents, multimedia, etc.

Document management systems provide organizations with an ability to create centralized repositories, or libraries, containing all of the unstructured data they generate. Powerful search and retrieval tools make this information easily available for use and collaboration across the entire enterprise. These tools often provide security and version control capabilities. However, storing and retrieving large numbers of paper documents has, in the past, been an onerous task. Present document management systems solve some of the problems faced by organizations that use a manual document filing system alongside an electronic document system. These systems provide a method for combining both computer-generated image documents and paper documents in a secure document storage and retrieval system.

Document management systems provide a means for freeing up storage space and reducing the costs of paper document copying and distribution. They often provide multiple methods of adding documents and indexing information to the document management system while facilitating easy revisions, creation of new versions, annotation, and document sharing. One of the most important aspects of document management systems is their ability to eliminate time-consuming physical searches for misfiled or lost documents. Some document management systems allow users to save various types of documents in a single location (i.e. related client emails and Word documents in the same folder). Furthermore, they provide companies with an ability to back up all essential business documents, both scanned and computer-generated, and may integrate optical character recognition ("OCR") technology so that full text searches may be performed on scanned documents.

In popular operating system ("OS") platforms (e.g., Microsoft Windows family), a user navigates the local file system using the integrated OS file management system (e.g., Windows Explorer). Through the use of this tool, documents can be manipulated in a variety of ways, e.g., moved, copied, and deleted. Many computer users have grown accustomed to using integrated file management systems, and are thus reluctant to switch to another file management tool to perform these operations. Document management systems from third-party vendors generally provide enhanced file management systems.

In addition, a benefit of document management systems is that they facilitate collaboration. One such method is providing document distribution functionality so that one user can easily share documents with or send documents to other users, devices or systems. Unfortunately, the document distribution functionality of document management systems generally calls for a user to manually select an appropriate distribution function for each document in the document management system. It would be preferable, however, if document distribution functionality provided users with the ability to automate transferring a plurality of documents to a selected data storage area

SUMMARY OF THE INVENTION

In accordance with one embodiment of the subject application, there is provided a system and method for managing a plurality of electronic documents in an associated plurality of data storage areas. User identification is first received and indicia corresponding to data storage areas is displayed on an associated data display. Storage selection data is then received from the associated user from the displayed data storage areas, for a plurality of incoming electronic documents. In accordance with the received storage selection data and the user identification data, a data storage area is designated from the selected displayed data storage areas configured to store the incoming electronic documents. A shadow data storage area associated with the designated data storage area is then created and an access code associated with the designated storage area is determined An input of incoming document systems is then associated with the shadow data storage area based upon the storage selection data, with the document systems including at least two different systems selected from a group consisting of image generating devices, electronic mail servers, Internet servers, and document management systems. Electronic documents are then received, each in its native format, from the associated document systems into the shadow data storage area. The determined access code is then associated with each of the incoming electronic documents in the shadow data storage area. A log associated with each of the incoming electronic documents corresponding to its associated history is then generated. Thereafter, the electronic documents and associated logs are routed into the designated storage area from the shadow storage area.

Still other advantages, aspects and features of the subject application will become readily apparent to those skilled in the art from the following description wherein there is shown and described a preferred embodiment of the subject application, simply by way of illustration of one of the best modes best suited to carry out the subject application. As it will be realized, the subject application is capable of other different embodiments and its several details are capable of modifications in various obvious aspects all without departing from the scope of the subject application. Accordingly, the drawings and descriptions will be regarded as illustrative in nature and not as restrictive.

BRIEF DESCRIPTION OF THE DRAWINGS

The subject application is described with reference to certain figures, including.

DETAILED DESCRIPTION OF THE PREFERRED EMBODIMENT

The document management system preferably provides access to a document management repository via a folder incorporated into the existing OS file structure. Although the present invention is described as enabling users to access document management functionality from a Microsoft Windows OS, it will be appreciated to those skilled in the art that the present invention is also suitably designed to interact with any OS, such as Unix, Linux, Macintosh or other OS. In one embodiment, the document management platform ("DMP") provides access to network-based documents via a browser, such as Internet Explorer or Netscape. In the presently preferred embodiment, a document repository managed by the DMP is represented as a folder or data storage area within an Internet Explorer window. The DMP permits a user to perform operations on the repository folder or data storage area, preferably insofar as the user has the appropriate access rights, as will be appreciated by those skilled in the art.

Figure 1:
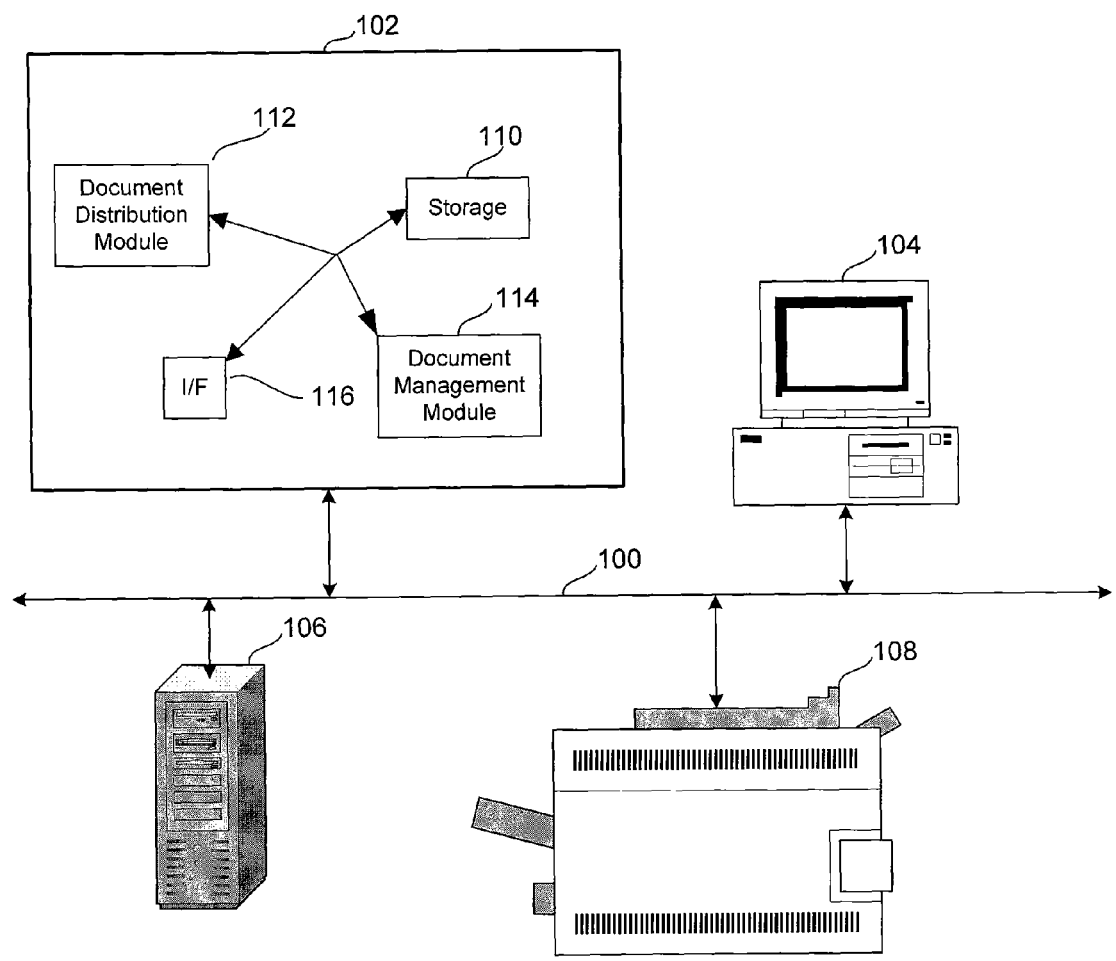
FIG. 1 is an overall diagram of a system for managing a plurality of electronic documents in an associated plurality of data storage areas according to one embodiment of the subject application.

Referring now to FIG. 1, an illustration of a network environment for practicing the present invention is provided. The system comprises a data transport network 100 illustrative of a LAN or WAN environment in which a preferred embodiment is provided, such as a packet-switched TCP/IP-based global communication network. The network 100 is suitably any network and is preferably comprised of physical layers and transport layers, as illustrated by a myriad of conventional data transport mechanisms like Ethernet, Token-Ring™, 802.11(b), or other wire-based or wireless data communication mechanisms as will be apparent to one of ordinary skill in the art.

Connected to a data transport network 100 is a document management platform ("DMP") 102. In the presently preferred embodiment, the DMP preferably is a plug-n-play device having a hardware component consisting of a closed-box server that is easy to install, configure and support, and software components, both of which will be described in greater detail hereinbelow. The DMP is suitably operable to provide services to at least one computer 104, at least one image generating device 108, and/or at least one server 106 connected to network 100. It is suitably a document distribution solution with document management capabilities.

The DMP 102 suitably replaces or supplements existing facsimile, print and electronic mail servers, and preferably offers a more efficient method of transmitting, tracking and storing business-to-business documents. The DMP 102 is preferably a client/server system, which is suitably implemented in both single and collaborative corporate workgroups (although not limited to such environments) and designed to increase productivity and reduce costs by making document communications more simple and reliable. The DMP 102 suitably provides functionality enabling users to share documents and conduct collaborative work between various workgroups. Also connected to data transport network 100 is computer 104. The computer 104 is suitably either a server or client running on any OS, such as Windows NT, Windows 2000, Windows XP, Unix, Linux, Macintosh or other operating system. In addition, the computer 104 is suitably a thick client or thin client, as will be appreciated by those skilled in the art. For example, LAN environment, the DMP 102 provides services from a "thin" browser-based client. The disclosed DMP architecture is suitably accommodating for a "thick client" driver-based computer 104 and for a "thin client" browser-based computer 104.

At least one image generating device 108 is connected to data transport network 100. The image generating device is suitably a device such as a printer, facsimile machine, scanning device, copier, multi-function peripheral ("MFPs"), or other like peripheral devices. The image generating device 108 is suitably any networked image generating device as will be appreciated to one of ordinary skill in the art. The image generating device 108 preferably has an internal device controller suitably acting as a fully functional server with the necessary hardware and software that ensure proper operation of the image generating device as will be appreciated by those skilled in the art. In addition, the image generating device 108 preferably comprises internal storage, which is suitably a hard disk and random access memory ("RAM") as will be appreciated by those skilled in the art.

Optionally, a server 106 is also connected to data transport network. Because both the image generating device and the DMP suitably have server functionality, an additional server is not necessary to practice the present invention. However, corporate networks rarely have only one server, and often have more than two servers, wherein the servers may be configured to perform different tasks. The server 106 is suitably any fully functional server with the necessary hardware and software to ensure proper operation. The server 106 is suitably a database server configured for selective query support, selective data access, data archiving, and the like, an electronic mail server, an application server, or any server configured for performing a function across a network.

The DMP 102 preferably comprises a Document Distribution Module ("DDM") 112 and a Document Management Module ("DMM") 114. It should be noted that the DMP 102 is not limited to these particular modules, and suitably comprises additional modules for device management. The main function of the DMM 114 is to store documents in a central document repository and to facilitate user capability to modify documents, collaborate during document editing, and search and locate stored documents. The main function of the DDM 112 is to route jobs to their destinations such as image generating devices, servers, computers, a document repository, etc.

The DMP 102 also suitably comprises internal storage, in which at least one document repository or data storage area is suitably maintained. The DMP 102 preferably interfaces with data transport network 100 via network interface 116. Thus, the DMP 102, server 106, computer 104 and at least one image generating device 108 are in shared communication.

The computer 104 suitably represents either a thick client or and a thin client with general interfaces to the DMP 102. The computer 104 interfaces with the DDM 112 for document distribution to selected devices. The DDM 112 suitably reports back to the computer 104 the status of the documents forwarded to the DDM 112 for distribution.

The DMM 114 works with the DDM 112 and its components to enable users to quickly store and retrieve documents from a central repository, which is preferably stored in storage 111 on the DMP 102, but is also suitably stored on any storage device in communication with data transport network 100. The repository allows a user to share documents and conduct collaborative work between various workgroups. Users of the DMP 102 preferably utilize a browser-based Graphical User Interface (GUI) from a computer 104 to access documents stored in a repository. The DMP 102 preferably offers support for conventional browsers, e.g., Microsoft Internet Explorer and Netscape Navigator, through an internal web server which is accessible from a thin client via a browser using the HTTP protocol. A WebDAV (Web Distributed Authoring and Versioning) client suitably communicates with the web server utilizing HTTP and WebDAV protocols. WebDAV is a two-way protocol designed to support editing of Web sites and handling of meta data.

When the DMM 114 receives a document in image form, such as it would from a facsimile or scanning device, it suitably routes the image to the repository for storage. The image can also be forwarded to the DDM 112 for further routing to an output device, e.g., a printer. In addition, the image file is also suitably routed to other document management systems ("ODMP") of a remote appliance over the network, and preferably ODMA compliant. A document received via email device is suitably processed as text or an attachment to a message and forwarded to the DMM 114. Both an image and a processed email document can be routed to the printer, repository, and ODMP, and/or other output devices via the DDM 112.

Figure 2:
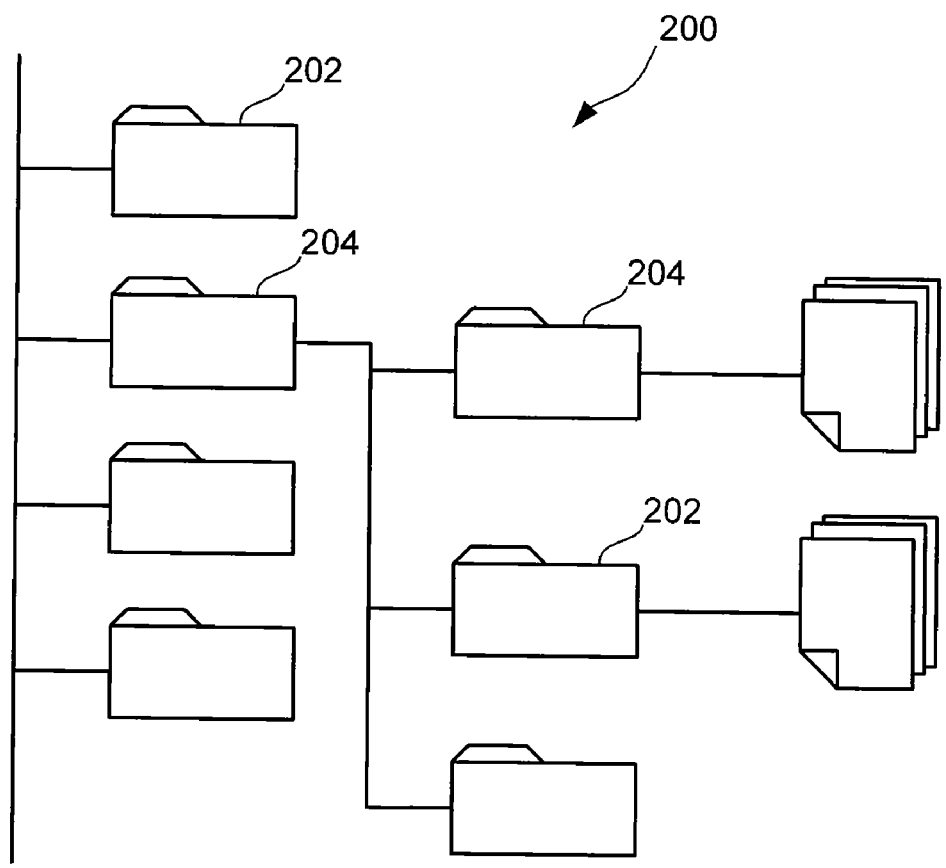
FIG. 2 is a diagram illustrating a hierarchical tree structure of a repository in a document management system according to one embodiment of the subject application.

Referring now to FIG. 2, there is illustrated a hierarchical folder tree structure of a repository according to the present invention. The repository 200 is suitably comprised of a plurality of file folders or data storage areas. Users can browse through the repository 200 to access file folders and documents. Authorized users can create a hierarchical tree by creating new file folders and documents. Each file folder suitably contains both file subfolders and documents. A user is presented with file folders of two types: a private folder 202 and a group folder 204. The private folder 202 allows only the folder owner access this type of file folder. The folder owner has all rights on the objects contained in it. The private folder 202 is suitably created when an Administrator creates the user account. The group folder 204 is visible to users belonging to the group(s) assigned to this file folder. The operations that a user can perform on objects contained in the group folder 204 are limited to the access rights inherited from the respective group.

In one embodiment, the document management system of the present invention also includes a inbox repository or storage area to post incoming scanned image data, facsimiles, printed data, and the like. Such storages areas are suitably personal storage areas for each user or group or shared storage areas. The scanned images, facsimiles, printed data, and the like are posted to such storage areas based on the parameters provided by the user.

The document management system of the present invention allows a user to capture or move a plurality of documents from at least one document system into at least one repository or data storage area at the same time. In order to capture or move such documents, the user selects the repository or data storage area to receive the documents. The user identifies the appropriate data storage area by providing selected information about the data storage area in any manner known in the art. Such information includes, but is not limited to, data storage area location, data storage area name, access permission, user name associated with the data storage area, and user name password. The user is suitably either a system user or a guest account. The information provided by the user is then verified, and if so, the user is allowed to then transfer or move a plurality of documents from one or more document system to the selected data storage area. Preferably, only one data storage area may be selected for each user.

Preferably, the data storage area is selected from a private folder, a group folder, and an electronic inbox. Preferably, documents and directory tree structures are suitably captured into the data storage area. In the event that directory tree structures are received into the data storage area, only the documents stored in those directories are captured in the data storage area.

The document system is preferably a document management system, an image generating device, an electronic mail server, and an Internet server. For example, in one embodiment, the user captures or moves the plurality of documents from a local drive or network hard drive utilizing an interface suitably implemented to allow the user to browse such devices and for selecting the documents. This is also called an upload operation. The interface allows the user to then point to the destination storage area or folder, and perform copy or move operations to place the documents in the destination data storage area or folder.

In another embodiment, the user captures input/output from an image generating device, such as scanning device, printer, copying machines, facsimile machines, and multi-functional peripherals. For example, the paper documents scanned by the user are converted to an image format and are stored in the user's personal storage, or inbox folder. The user has an option of moving the documents from his/her inbox to a particular data storage area or folder in the repository.

Additionally, in another embodiment, the user captures from electronic mail as both text and an attachment. Documents sent via electronic mail are stored in the user inbox. The user has an option of moving the documents from the inbox to a particular data storage area or folder in the repository.

In another embodiment, the user captures documents or files from servers disposed on the Internet. The GUI provides the capability of specifying the URL of the source document(s) and the destination file folder. The DMP 202 then facilitates download of the specified documents for storage in the specified data storage area or folder.

In one embodiment, the document management system also includes means adapted for deselecting the desired data storage area so that the designated data storage area no longer receives documents or data from the document system. Until the user deselects the designated document area, all electronic documents and data are received from the document system into the designated document storage area. At this point, the user may stop the process or select another data storage area to receive documents or data.

In one embodiment, the document management system also includes means adapted for locking alternative data storage areas such that only the designated data storage area receives documents and data from the specified document system.

In another embodiment, the document management system provides a plurality of data storage areas or folders and each area or folder is associated with an individual user as discussed above. In this embodiment, a plurality of data storage areas are selected. Each selected data storage area or folder then receives documents or data for its associated individual user from the document system. Preferably, only one data storage area may be selected for each user. Preferably, in this embodiment, the document management system also includes means adapted for deselecting the desired data storage area for each individual user so that the designated data storage area no longer receives documents or data from the document system. Until the designated document area is deselected, all electronic documents and data are received from the document system into the designated document storage area associated with such individual user.

In one embodiment, the shadow data storage area is created without reference to the public or private nature of the designated data storage area selected by the user. In such an embodiment, the access code associated with the designated storage area is determined and any incoming electronic documents, e.g. received from one or more document systems, are associated with the determined access code in the shadow area. Thereafter, the document management system generates a log for each received document that contains the document's history, modifications, usage, versions, user access, and the like. Each document and its associated log are then transferred, or routed, from the shadow data storage area into the designated storage area.

In another embodiment, the document management system includes tracking means configured to monitor access and modifications of stored documents. In such an embodiment, the system updates the log associated with each document based upon the output of the tracking means.

In a further embodiment, at least one additional user is able to access stored electronic documents based upon authorization associated with the user. That is, the user logs onto the system and storage areas associated with the user, or accessible because of rights associated with the user, are displayed for selection. The user is then capable of accessing the documents in the displayed storage areas as a result of the user's authentication.

In one embodiment, the user is capable of accessing only specific storage areas based upon the input of an access code. That is, the user, following submittal of authentication data, selects a storage area from those displayed. The user is then prompted to input the access code associated with the documents in that storage area. Following validation of the access code, the user is provided access to the electronic documents stored in the selected storage area.

Figure 3A:
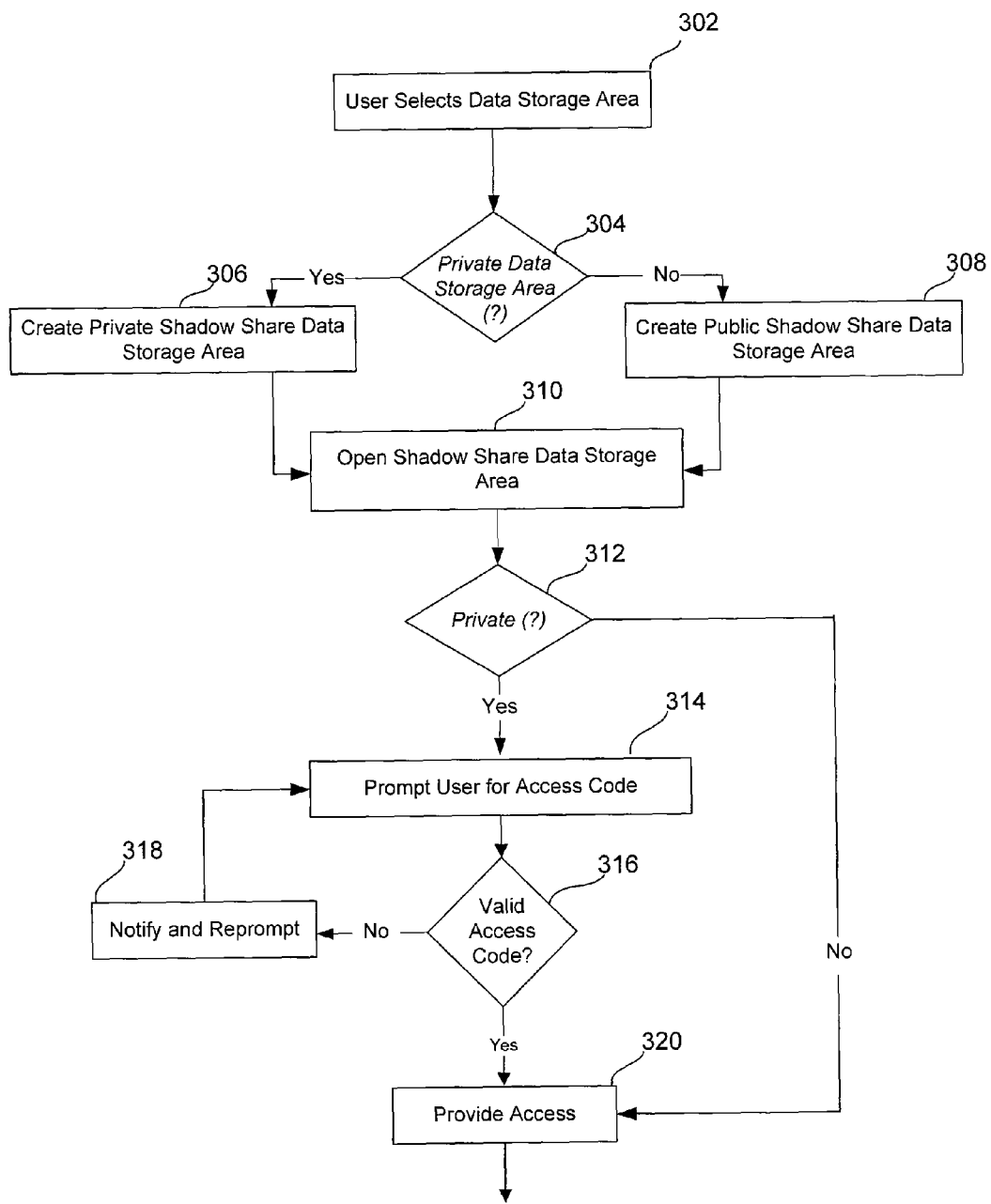
FIG. 3a is a flowchart illustrating a method for managing a plurality of electronic documents in an associated plurality of data storage areas according to one embodiment of the subject application.
Figure 3B:
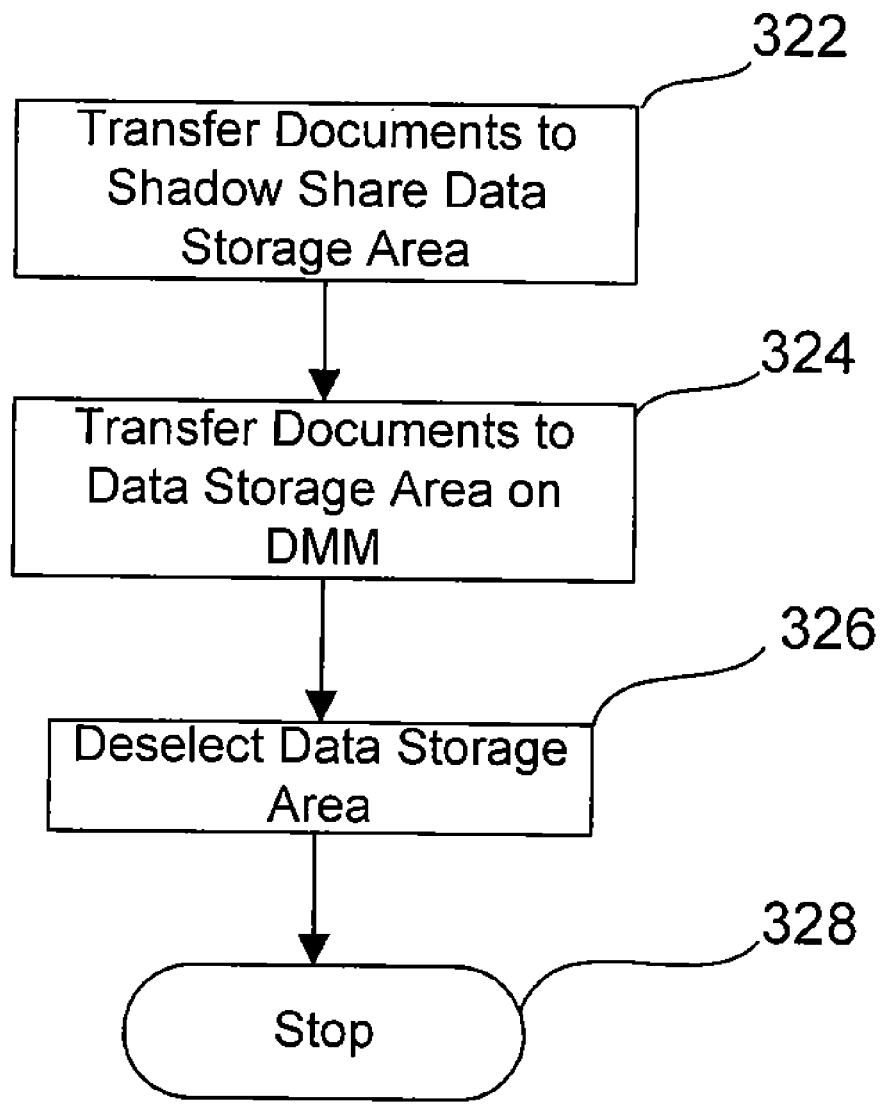
FIG. 3b is a flowchart illustrating a method for managing a plurality of electronic documents in an associated plurality of data storage areas according to one embodiment of the subject application.

Referring now to FIGS. 3a and 3b, there is illustrated a flow chart of the process for moving a plurality of documents to at least one selected data storage area according to the present invention. Flow commences at process block 302 where the user selects the data storage area or folder to which the documents are to be transferred. Flow then proceeds to decision block 304 wherein a determination is made if the selected data storage area is a private data storage area. If the determination is positive, the process proceeds to process block 306 wherein a shadow share data storage area corresponding to the selected data storage area on the DMM is created on the server. If the determination is negative, the process proceeds to process block 308 wherein a shadow share data storage area corresponding to the selected data storage area on the server is created on the server.

Flow then proceeds to process block 310 wherein the shadow share data storage area is opened. A determination is then made at decision block 312 to determine if the shadow data storage area is a private data storage area. If the determination is negative, flow proceeds to process block 320. If the determination is positive, then process proceeds to process block 314 where the user is prompted to provide a username and password to gain access to the data storage area.

User rights to the folder are suitably assigned by an Administrator in accordance with the level of access provided to that particular user. For example, the user may be granted full access to his or her documents in private folders, yet restricted to a lesser read-only access to documents in the group folder. The Administrator can set the rights to any user, and to any document location. Note that the username/password login can be implemented as a single login coinciding with the network login, or as separate logins. Thus when the DMP 102 prompts the user for a username/password as a separate login procedure, flow progresses to decision block 316 wherein a determination is made whether the access code or login is valid.

A negative determination at decision block 316 means that the user entered invalid login information, which causes progress back to process block 318, where the user is again prompted to enter a valid access code or login.

A positive determination at decision block 316 means that the user entered a valid login, which causes progression to process block 320 wherein the user is provided access to the repository. The user is suitably granted access in accordance with the rights assigned by an Administrator and associated with the login information provided by the user.

Flow then continues to process block 322 wherein the user moves or copies a plurality of documents from the document system to the shadow share data storage area. At this point, progression flows to process block 324 wherein after a predetermined time, the documents are transferred from the shadow share data storage area to the corresponding data storage area located on the DMM.

Flow then continues to process block 326 wherein the user deselects the selected data storage container so that the data storage area no longer receives documents from the document system. The deselection of the data storage area may occur at any time. At this point, the user may select another data storage area to receive documents or stop the process as shown at 328.

Figure 4A:
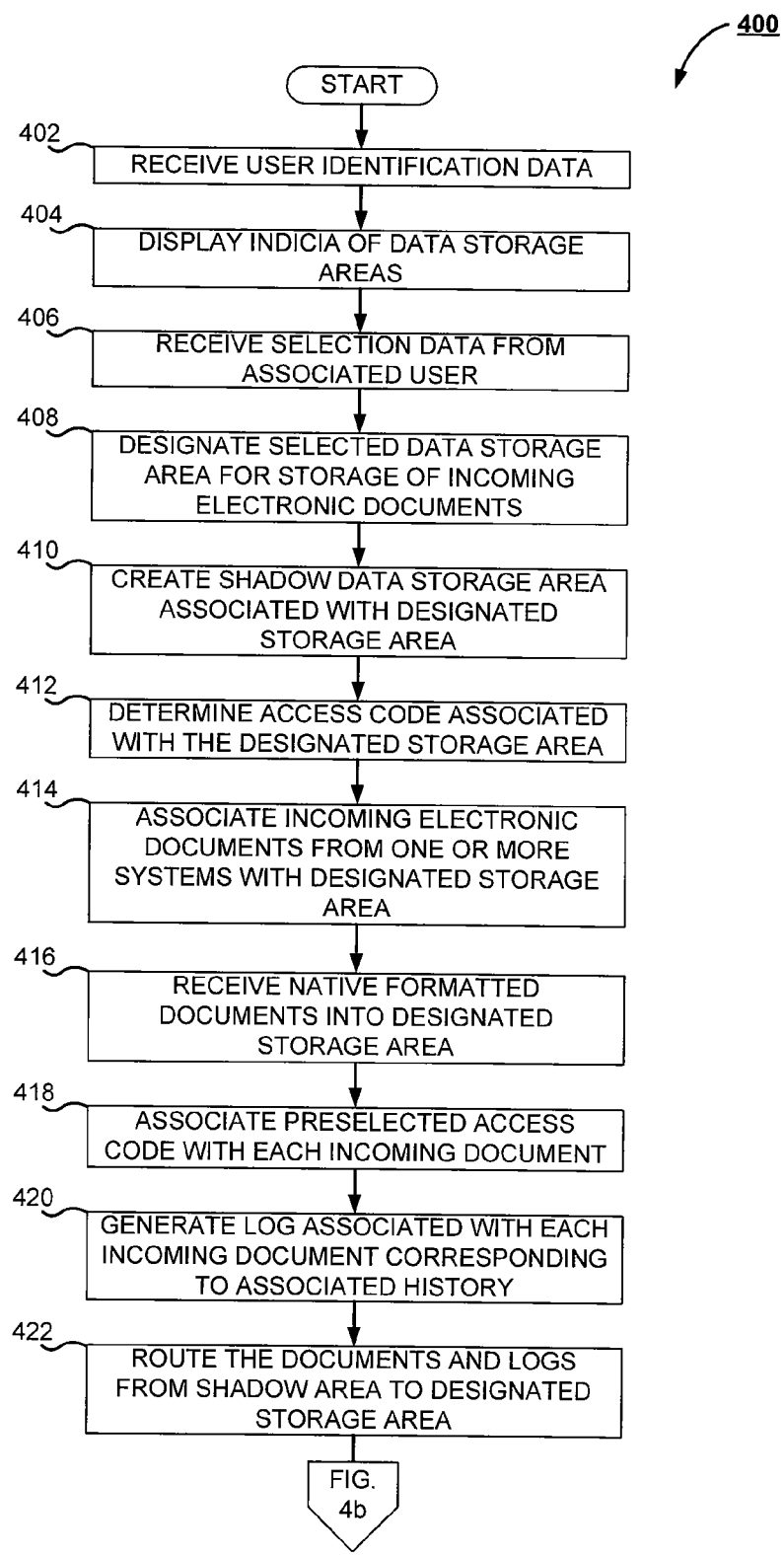
FIG. 4a is a flowchart illustrating a method for managing a plurality of electronic documents in an associated plurality of data storage areas according to one embodiment of the subject application.

Turning now to FIG. 4a, there is shown one example embodiment of the method for managing a plurality of electronic documents in an associated plurality of data storage areas in accordance with the subject application. The flowchart 400 illustrated in FIG. 4a begins at step 402, whereupon user identification data is received from an associated user representing an identity of the user. At step 404, indicia is displayed on an associated display corresponding to each of a plurality of displayed data storage areas. Suitable indicia are illustrated in FIG. 2, discussed in greater detail above. Storage selection data is then received from an associated user at step 406. In accordance with one embodiment of the subject application, the storage selection data corresponds to a user selected storage area that is selected from the plurality of displayed data storage areas, for a plurality of incoming electronic documents. According to one embodiment of the subject application, the storage areas are representative of portions of the DMP 102, the server 106, or other associated data storage device associated with the network 100.

At step 408, a data storage area from the selected displayed data storage area adapted to store the incoming electronic documents is designated in accordance with the received selection data and the user identification data. A shadow data storage area is then created at step 410 in association with the designated storage area. It will be appreciated by those skilled in the art that such shadow data storage area is capable of implementation as a private area corresponding to a private data storage area accessible via a private access code, a public area corresponding to shared memory accessible by multiple users without access coding, or the like. At step 412, the designated storage area is tested so as to determine an access code associated with access to the storage area selected by the user. In accordance with one embodiment of the subject application, the access code is associated with the user, the particular storage area, type of document system, a type of document, or the like. The skilled artisan will appreciate that the presence of an access code is capable of indicating a private storage area or a public storage area, i.e. if private the access code is hidden except to those authorized users and if public the access code is made known to each user attempting access or otherwise supplied for authorization.

An input of incoming document systems is then associated with the shadow data storage area at step 414 in accordance with the storage selection data. According to one embodiment of the subject application, the document systems include at least two different systems selected from the group of image generating devices, electronic mail servers, Internet servers, and document management systems. At step 416, multiple electronic documents are received from the document systems into the shadow data storage area. Preferably, each of the aforementioned documents is in their respective native formats, e.g. the format native to the document system from which they were received.

The access code determined from the testing of the designated storage area is then associated with each of the incoming electronic documents in the shadow data storage area at step 418. At step 420, a log associated with each of the incoming electronic documents is generated corresponding to a history associated with each respective document. The electronic documents and associated logs are then routed at step 422 into the designated data storage area from the shadow data storage area.

Figure 4B:
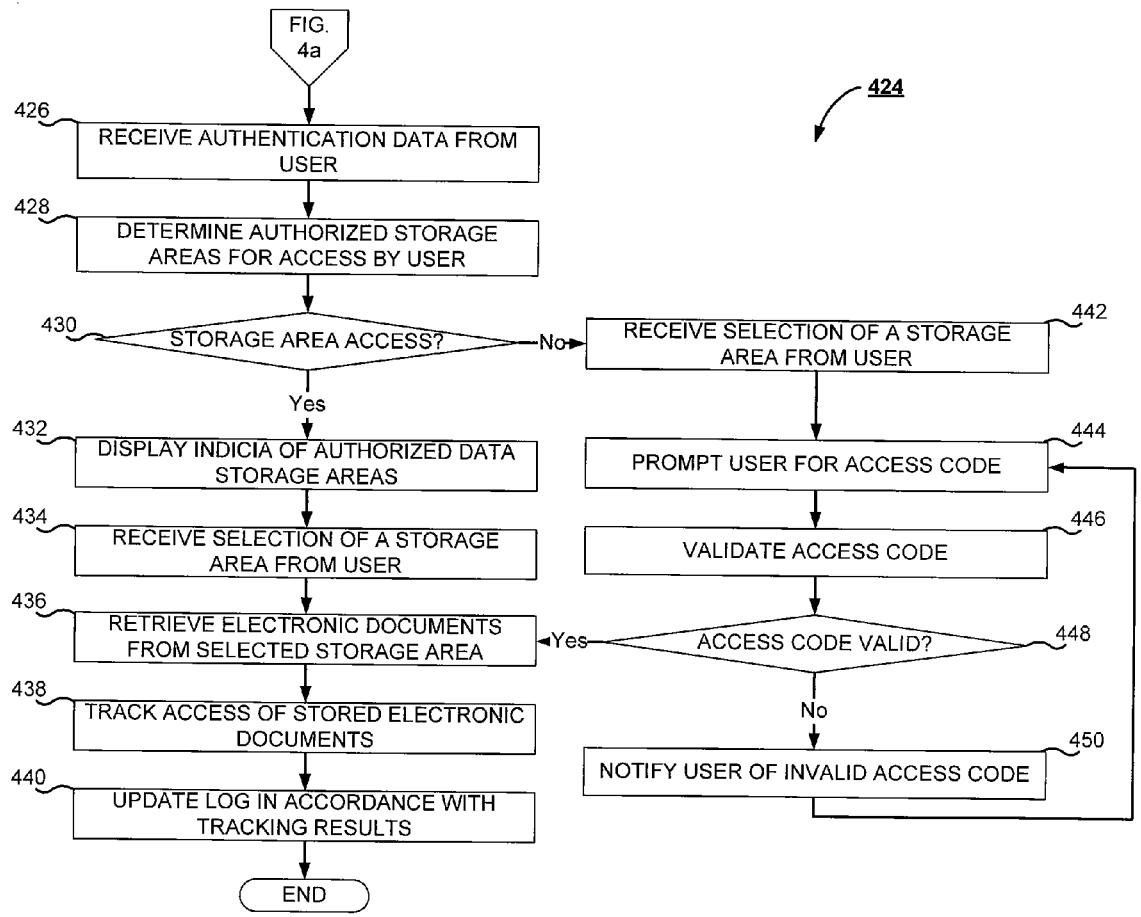
FIG. 4b is a flowchart illustrating a method for managing a plurality of electronic documents in an associated plurality of data storage areas according to one embodiment of the subject application.

Referring now to FIG. 4b, there is shown a flowchart 424 illustrating authorized user access of stored documents in accordance with one embodiment of the subject application. The skilled artisan will appreciate that such methodology depicted in FIG. 4b corresponds to one example implementation and other suitable implementations are equally capable of being employed in accordance with the system and method of the subject application. The method of FIG. 4b begins at step 426, whereupon authentication data is received from at least one additional user. At step 428, a determination is made of any storage areas to which the additional user is authorized to access. A determination is then made at step 430 whether any data storage areas are available for access in accordance with the authentication data received from the additional user.

Upon a determination at step 430 that at least one data storage area is accessible to the additional user based upon the received authentication data, flow proceeds to step 432. At step 432, indicia is displayed on the associated data display corresponding to the at least one authorized displayed data storage areas. A selection is then received from the additional user at step 434 corresponding to an authorized displayed storage area. Electronic documents are then retrieved from the selected storage area for which the additional user is authorized at step 436. Access of the electronic documents is then tracked at step 438, e.g. any operations performed on the documents by the additional user are tracked and monitored by the DMP 102, a suitable component thereof, the server 106, or other component associated with the network 100 as will be appreciated by those skilled in the art. Thereafter, at step 440, the log associated with each accessed electronic document is updated in accordance with the tracking operation performed at step 438.

Returning to step 430, when it is determined that no storage areas have authorized access for the additional user, flow proceeds to step 442. At step 442, selection data is received from the additional user corresponding to at least one storage area associated with the DMP 102. The additional user is then prompted at step 444 for an access code associated with the selected storage area. Validation of the access code is then performed at step 446 via the DMP 102, or a suitable component associated therewith. At step 448, a determination is made whether the access code provided by the additional user in response to the prompt at step 444 is valid for access to the selected storage area. Upon a negative determination at step 448, flow proceeds to step 450, whereupon the additional user is notified of an invalid access code. Operations then return to step 444 for input by the additional user of an appropriate access code to the selected storage area. Upon a positive determination at step 448, operations proceed to step 436, whereupon electronic documents are then retrieved from the selected storage area for which the additional user has provided the valid access code. Access of the electronic documents is then tracked at step 438, e.g. any operations performed on the documents by the additional user are tracked and monitored by the DMP 102, a suitable component thereof, or other component associated with the network 100 as will be appreciated by those skilled in the art. Operations then progress to step 440, whereupon the log associated with each accessed electronic document is updated in accordance with the tracking operation performed at step 438.

Although system as described runs on a network appliance, it is appreciated that it can also run on other operating systems, for example, Linux (and other Unix operating systems), and OS by Apple Computers. Although the preferred embodiment has been described in detail, it should be understood that various changes, substitutions, and alterations can be made therein without departing from the spirit and scope of the invention as defined by the appended claims. It will be appreciated that various changes in the details, materials and arrangements of parts, which have been herein described and illustrated in order to explain the nature of the invention, may be made by those skilled in the area within the principle and scope of the invention as will be expressed in the appended claims.

What is claimed:

1. A method for managing a plurality of electronic documents in an associated plurality of data storage areas comprising the steps of:
   receiving user identification data representative of an identity of an associated user;
   displaying, on an associated data display, indicia corresponding to each of a plurality of displayed data storage areas;
   receiving, from an associated user, storage selection data representative of a user selected storage area, selected from the plurality of displayed data storage areas, for a plurality of incoming electronic documents;

designating, in accordance with received storage selection data and user identification data, a data storage area from the selected displayed data storage area adapted for storage of the plurality of incoming electronic documents;

creating a shadow data storage area associated with the designated data storage area;

determining an access code associated with the designated storage area;

associating an input of a plurality of incoming document systems with the shadow data storage area in accordance with the storage selection data wherein the document systems include at least two different systems selected from a group consisting of image generating devices, electronic mail servers, Internet servers, and document management systems;

receiving a plurality of electronic documents, each in its native format, from the plurality of associated document systems into the created shadow data storage area after completion of the step of designating;

associating the determined access code with each of the plurality of incoming electronic documents in the shadow data storage area in accordance with an output of the access code determining step;

generating a log associated with each of the plurality of incoming electronic documents corresponding to a history associated therewith; and routing, into the designated data storage area from the shadow data storage area, the plurality of received electronic documents and each log associated therewith.

2. The method of claim 1, wherein the access code is associated with at least one of the group consisting of the user, a storage area, and a document system.

3. The method of claim 2, further comprising the steps of:

tracking access of at least one of the stored electronic documents subsequent to the storage thereof; and updating the log associated with the access of the at least one stored electronic document in accordance with an output of the tracking step.

4. The method of claim 3, further comprising the steps of:

receiving authentication data from at least one additional user;

determining at least one authorized data storage area in accordance with received authentication data; and displaying, on the associated data display, indicia corresponding to the at least one authorized displayed data storage area.

5. The method of claim 4, wherein the authentication data includes at least one of the group consisting of user account data and administrator account data.

6. The method of claim 3, further comprising the steps of:

receiving selection data from the at least one additional user corresponding to at least one selected storage area;

prompting the at least one additional user for an access code associated with the at least one selected storage area;

validating the access code; and retrieving at least one stored electronic document from the at least one selected storage area in accordance with the received access code.

7. The method of claim 1, wherein the selected data storage area is selected from the group consisting of a private repository folder, a network repository folder, and an electronic mail inbox.

8. A system for managing a plurality of electronic documents in an associated plurality of data storage areas comprising:

means adapted for receiving user identification data representative of an identity of an associated user;

display means adapted for displaying, on an associated data display, indicia corresponding to each of a plurality of displayed data storage areas;

means adapted for receiving, from an associated user, storage selection data representative of a user selected storage area, selected from the plurality of displayed data storage areas, for a plurality of incoming electronic documents;

means adapted for designating, in accordance with received storage selection data and user identification data, a data storage area from the selected displayed data storage area adapted for storage of the plurality of incoming electronic documents;

means adapted for creating a shadow data storage area associated with the designated data storage area;

means adapted for determining an access code associated with the designated storage area;

means adapted for associating an input of a plurality of incoming document systems with the shadow data storage area in accordance with the storage selection data wherein the document systems include at least two different systems selected from a group consisting of image generating devices, electronic mail servers, Internet servers, and document management systems;

means adapted for receiving a plurality of electronic documents, each in its native format, from the plurality of associated document systems into the created shadow data storage area in accordance with an output of the designating means;

means adapted for associating the determined access code with each of the plurality of incoming electronic documents in the shadow data storage area in accordance with an output of the access code determining means;

means adapted for generating a log associated with each of the plurality of incoming electronic documents corresponding to a history associated therewith; and routing means adapted for routing, into the designated data storage area from the shadow data storage area, the plurality of received electronic documents and each log associated therewith.

9. The system of claim 8, wherein the access code is associated with at least one of the group consisting of the user, a storage area, and a document system.

10. The system of claim 9, further comprising:

means adapted for tracking access of at least one of the stored electronic documents subsequent to the storage thereof; and means adapted for updating the log associated with the access of the at least one stored electronic document in accordance with an output of the tracking means.

11. The system of claim 10, further comprising:

means adapted for receiving authentication data from at least one additional user;

means adapted for determining at least one authorized data storage area in accordance with received authentication data; and display means adapted for displaying, on the associated data display, indicia corresponding to the at least one authorized displayed data storage area.

12. The system of claim 11, wherein the authentication data includes at least one of the group consisting of user account data and administrator account data.

13. The system of claim 10, further comprising:
means adapted for receiving selection data from the at least one additional user corresponding to at least one selected storage area;
means adapted for prompting the at least one additional user for an access code associated with the at least one selected storage area;
means adapted for validating the access code; and
means adapted for retrieving at least one stored electronic document from the at least one selected storage area in accordance with the received access code.

14. The system of claim 8, wherein the selected data storage area is selected from the group consisting of a private repository folder, a network repository folder, and an electronic mail inbox.

* * * * *